UNITED STATES PATENT OFFICE.

PETER F. HAVERTY, OF SHENANDOAH, PENNSYLVANIA.

ARTIFICIAL STONE.

SPECIFICATION forming part of Letters Patent No. 284,299, dated September 4, 1883.

Application filed June 11, 1883. (No specimens.)

*To all whom it may concern:*

Be it known that I, PETER F. HAVERTY, a citizen of the United States, residing at Shenandoah, in the county of Schuylkill and State of Pennsylvania, have invented certain new and useful Improvements in Artificial Stone; and I do declare the following to be a full, clear, and exact description of the invention, such as will enable others skilled in the art to which it appertains to make and use the same.

My invention consists in the composition of the following ingredients and solutions, mixed and combined in the manner hereinafter set forth.

I take of Portland cement, three parts; marble-dust, two parts; clean sharp sand, one part; plaster-of-paris, one part. All of these ingredients are to be thoroughly mixed together in a dry state. I then form a solution by dissolving, in four gallons of water, sal-ammoniac, four ounces; hartshorn, four ounces; washing-soda, eight ounces; and to this I add one quart of benzine. I make another solution of two pounds of good glue in four gallons of water.

To make my artificial stone I take one-half gallon of the first solution, add six gallons of water to it, and then add the glue solution in a warm state, thoroughly stirring and mixing all together. This final mixture should stand not less than an hour, and then should be mixed with the cement, sand, &c., so that the whole forms a stiff mass, which is to be molded or formed as may be desired. This composition will harden very readily, and will resist the action of the weather. It may be made of any density desired, and may be colored to imitate any colored natural stone.

In the preparation of artificial stone for various uses it is necessary to produce soft or hard stone, as occasion requires, and this is easily accomplished by varying the proportions of cement, sand, &c., or by omitting the plaster-of-paris or marble-dust, the mixing solutions remaining as herein stated.

I am aware that some of the ingredients I use have heretofore been used for the manufacture of artificial stone; but I am not aware that all the ingredients, as I combine and use them in my composition, have ever before been used for that purpose.

What I claim, and desire to secure by Letters Patent, is—

The composition for the manufacture of artificial stone herein set forth, consisting of a mixture of sand, cement, marble-dust, plaster-of-paris, sal-ammoniac, hartshorn, washing-soda, benzine, glue, and water.

In testimony whereof I affix my signature in presence of two witnesses.

PETER F. HAVERTY.

Witnesses:
A. B. M'COOL,
B. V. NICHOLS.